United States Patent
Chang

(10) Patent No.: US 8,869,816 B2
(45) Date of Patent: Oct. 28, 2014

(54) MIXED WATER CONTROL VALVE HAVING A WATER PRESSURE BALANCE FUNCTION TO STABILIZE WATER TEMPERATURE

(75) Inventor: Chia-Po Chang, Lugang Township, Changhua County (TW)

(73) Assignee: HAIN YO Enterprise Co. Ltd., Changhua (TW)

( * ) Notice: Subject to any disclaimer, the term of this patent is extended or adjusted under 35 U.S.C. 154(b) by 376 days.

(21) Appl. No.: 12/965,972

(22) Filed: Dec. 13, 2010

(65) Prior Publication Data

US 2012/0145936 A1 Jun. 14, 2012

(51) Int. Cl.
*G05D 11/00* (2006.01)
*F16K 11/078* (2006.01)
*F16K 17/26* (2006.01)
*G05D 23/13* (2006.01)

(52) U.S. Cl.
CPC ............. *F16K 11/0787* (2013.01); *F16K 17/26* (2013.01); *G05D 23/1313* (2013.01)
USPC ........................................ 137/100; 137/625.4

(58) Field of Classification Search
CPC ............ F16K 11/0782; F16K 11/0787; F16K 27/044; F16K 27/045
USPC ............ 137/98, 100, 315.09, 315.11, 315.12, 137/454.6, 625.4
See application file for complete search history.

(56) References Cited

U.S. PATENT DOCUMENTS

| | | | | |
|---|---|---|---|---|
| 5,826,611 A | * | 10/1998 | Ko | ................................. 137/100 |
| 5,839,471 A | * | 11/1998 | Yang | ......................... 137/625.18 |
| 6,009,893 A | * | 1/2000 | Chang | ............................. 137/98 |
| 7,918,241 B1 | * | 4/2011 | Chang | ............................. 137/98 |

OTHER PUBLICATIONS

"Integral", MacMillan Dictionary, Nov. 2013.*

* cited by examiner

*Primary Examiner* — Stephen M Hepperle
*Assistant Examiner* — R. K. Arundale
(74) *Attorney, Agent, or Firm* — Che-Yang Chen; Law Office of Michael Chen

(57) ABSTRACT

A mixed water control valve for a faucet includes a valve housing, a control unit, and a balance unit. The valve housing has a mounting seat which has a receiving chamber and two water inlet holes. The balance unit includes a fixed sleeve secured in the receiving chamber, a pressure regulating sleeve movably mounted in the fixed sleeve, a balance baffle mounted in the pressure regulating sleeve, and two elastic members each mounted in the pressure regulating sleeve and each biased between the balance baffle and the mounting seat. Thus, the balance baffle is compressed between the elastic members which provide a buffering force to counteract a larger pressure applied on the balance baffle, so that the pressure regulating sleeve is moved smoothly and stably without producing resonant noise in the faucet.

3 Claims, 6 Drawing Sheets

MIXED WATER CONTROL VALVE HAVING A WATER PRESSURE BALANCE FUNCTION TO STABILIZE WATER TEMPERATURE

BACKGROUND OF THE INVENTION

1. Field of the Invention

The present invention relates to a control valve and, more particularly, to a mixed water control valve for a faucet to control the temperature of a mixture of cold and hot water of the faucet.

2. Description of the Related Art

A conventional faucet comprises a control valve to mix the cold water from a cold water source and the hot water from a hot water source and to inject the mixed water outwardly for use with a user. Thus, the mixed water has a proper temperature so that the user can use the water comfortably. However, when the water flow from the cold water source or the hot water source is reduced or stops accidentally due to an irregular condition, the water pressure of the cold and hot water is not balanced, so that the water temperature is increased or decreasing to an excessive extent instantaneously to make the water too hot or too cold, thereby easily causing an uncomfortable sensation to the user due to the too cold water or evenly causing danger to the user due to the too hot water (the user is easily scalded by the too hot water).

A conventional control valve for a faucet comprises a valve housing, a control unit mounted on the valve housing, and a balance unit mounted in the valve housing. The valve housing has a bottom provided with a mounting seat which has two water inlet holes. One of the two water inlet holes of the mounting seat is connected to a cold water source, and the other one of the two water inlet holes of the mounting seat is connected to a hot water source. The balance unit includes a fixed sleeve secured the mounting seat, and a pressure regulating sleeve movably mounted in the fixed sleeve. In operation, the cold water from the cold water source and the hot water from the hot water source in turn flow through the two water inlet holes of the mounting seat and the fixed sleeve into the pressure regulating sleeve respectively. In such a manner, when the water flow of a first one (for example, the cold water terminal) of the water inlet holes is reduced accidentally or stopped abnormally due to an irregular condition, the water pressure of the first one (the cold water terminal) of the water inlet holes is reduced or disappears. Thus, the greater water pressure of a second one (for example, the hot water terminal) of the water inlet holes will push the pressure regulating sleeve so that the pressure regulating sleeve is moved in the fixed sleeve so as to reduce or stop the water flow of the second one (the hot water terminal) of the water inlet holes. Thus, the pressure regulating sleeve is moved by a pressure differential between the two water inlet holes so that the water flow of the two water inlet holes can be regulated by movement of the pressure regulating sleeve so as to achieve a water pressure balance and to stabilize the temperature of the mixed water in the valve housing. However, when the (cold or hot) water only flows through one of the two water inlet holes of the mounting seat, while other water equipment is also opened simultaneously, a larger pressure is applied on the pressure regulating sleeve to push and move the pressure regulating sleeve violently, thereby easily producing a resonant noise in the faucet. In addition, the pressure regulating sleeve is moved quickly in the fixed sleeve due to the larger pressure so that the pressure regulating sleeve will hit or wear the fixed sleeve, thereby decreasing the lifetime of the balance unit.

BRIEF SUMMARY OF THE INVENTION

In accordance with the present invention, there is provided a mixed water control valve, comprising a valve housing, a control unit mounted on the valve housing, and a balance unit mounted in the valve housing. The valve housing has an open top and has a bottom provided with a mounting seat. The mounting seat has an upper end provided with a receiving chamber to receive the balance unit and has a lower end provided with two water inlet holes each connected to the receiving chamber. The balance unit includes a hollow fixed sleeve secured in the receiving chamber of the mounting seat, a pressure regulating sleeve movably mounted in the fixed sleeve, a balance baffle mounted in the pressure regulating sleeve, and two elastic members each mounted in the pressure regulating sleeve and each biased between the balance baffle and the mounting seat.

According to the primary advantage of the present invention, the balance baffle is compressed between the two elastic members which provide a buffering force to counteract the larger pressure applied on the balance baffle when the water only flows through one of the two water inlet holes, so that the pressure regulating sleeve is moved smoothly and stably without producing resonant noise in the faucet.

According to another advantage of the present invention, the pressure regulating sleeve is moved slowly in the fixed sleeve by buffering of the two elastic members so that the pressure regulating sleeve will not hit or wear the fixed sleeve so as to enhance the lifetime of the balance unit.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
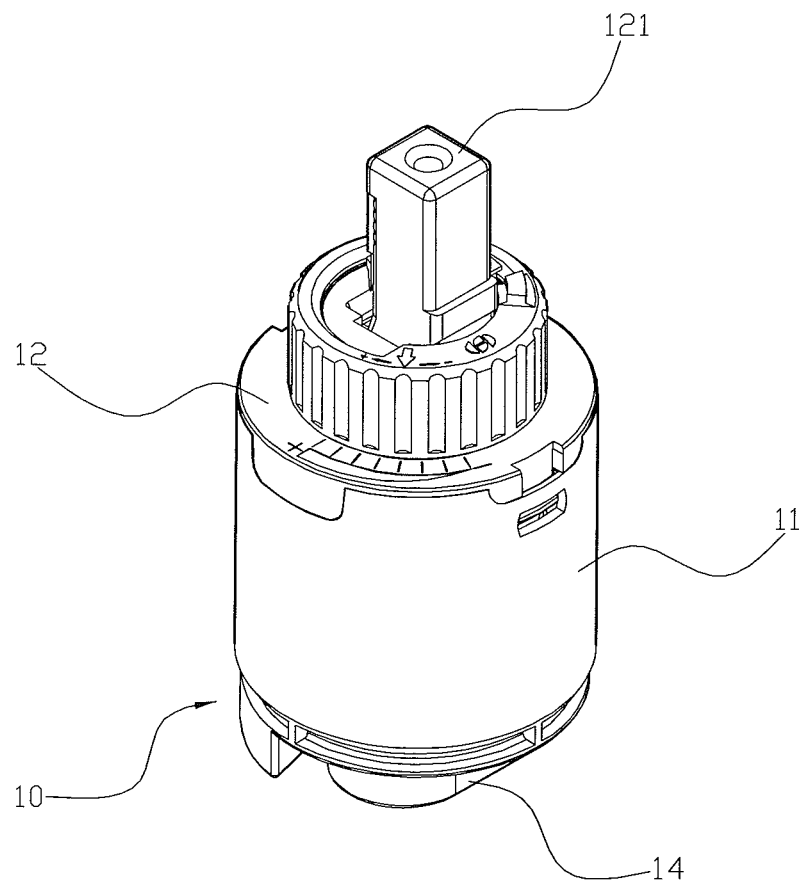
FIG. 1 is a perspective view of a mixed water control valve for a faucet in accordance with the preferred embodiment of the present invention.

Referring to the drawings and initially to FIGS. 1-4, a control valve for a faucet in accordance with the preferred embodiment of the present invention comprises a valve housing 11, a control unit 10 mounted on the valve housing 11, and a balance unit 20 mounted in the valve housing 11.

The valve housing 11 has an open top and has a bottom provided with a mounting seat 14 which protrudes outward from the valve housing 11. The mounting seat 14 has an upper end provided with a receiving chamber 141 connected to an inner space of the valve housing 11 to receive the balance unit 20 and has a lower end provided with two water inlet holes 142 each connected to the receiving chamber 141. The mounting seat 14 has a side provided with a water outlet hole 15 connected to the valve housing 11. One of the two water inlet holes 142 of the mounting seat 14 is connected to a cold water source (not shown), and the other one of the two water inlet holes 142 of the mounting seat 14 is connected to a hot water source (not shown).

The control unit 10 includes a switching module 13 adjustably mounted in the valve housing 11 and an operation module 12 mounted on the valve housing 11 and connected with the switching module 13. The switching module 13 of the control unit 10 is made of precision ceramic material. The operation module 12 of the control unit 10 is mounted on the open top of the valve housing 11 to close the open top of the valve housing 11. The operation module 12 of the control unit 10 is provided with a protruding control handle 121 to operate the switching module 13 so as to open/close the water flow or to change the mixed proportion of the hot and cold water.

The balance unit 20 is mounted between the valve housing 11 and the control unit 10 and includes a hollow fixed sleeve 21 secured in the receiving chamber 141 of the mounting seat 14, a pressure regulating sleeve 22 movably mounted in the fixed sleeve 21, a balance baffle 222 mounted in the pressure regulating sleeve 22, and two elastic members 23 each mounted in the pressure regulating sleeve 22 and each biased between the balance baffle 222 and the mounting seat 14.

The fixed sleeve 21 of the balance unit 20 has two open ends each connected to the receiving chamber 141 of the mounting seat 14. The fixed sleeve 21 of the balance unit 20 has a periphery provided with two connecting grooves 211 each connected to a respective one of the two water inlet holes 142 of the mounting seat 14.

The pressure regulating sleeve 22 of the balance unit 20 has two open ends each connected to the receiving chamber 141 of the mounting seat 14. The pressure regulating sleeve 22 of the balance unit 20 has a periphery provided with two connecting slots 223 each movable to align or partially align with a respective one of the two connecting grooves 211 of the fixed sleeve 21. The pressure regulating sleeve 22 of the balance unit 20 has an inner portion provided with two receiving spaces 221 to receive the two elastic members 23. Each of the two receiving spaces 221 of the pressure regulating sleeve 22 is connected to a respective one of the two connecting slots 223 and is connected to the receiving chamber 141 of the mounting seat 14.

The balance baffle 222 of the balance unit 20 is located at a middle position of the pressure regulating sleeve 22 and is located between the two receiving spaces 221. The balance baffle 222 of the balance unit 20 is also located between the two connecting slots 223. The balance baffle 222 of the balance unit 20 is compressed between the two elastic members 23 so that the pressure regulating sleeve 22 of the balance unit 20 is kept at a middle position of the fixed sleeve 21 by the two elastic members 23.

Each of the two elastic members 23 of the balance unit 20 is received in a respective one of the two receiving spaces 221 of the pressure regulating sleeve 22. Each of the two elastic members 23 of the balance unit 20 is a compression spring and has a first end pressing the balance baffle 222 and a second end pressing a peripheral wall of the receiving chamber 141.

Figure 2:
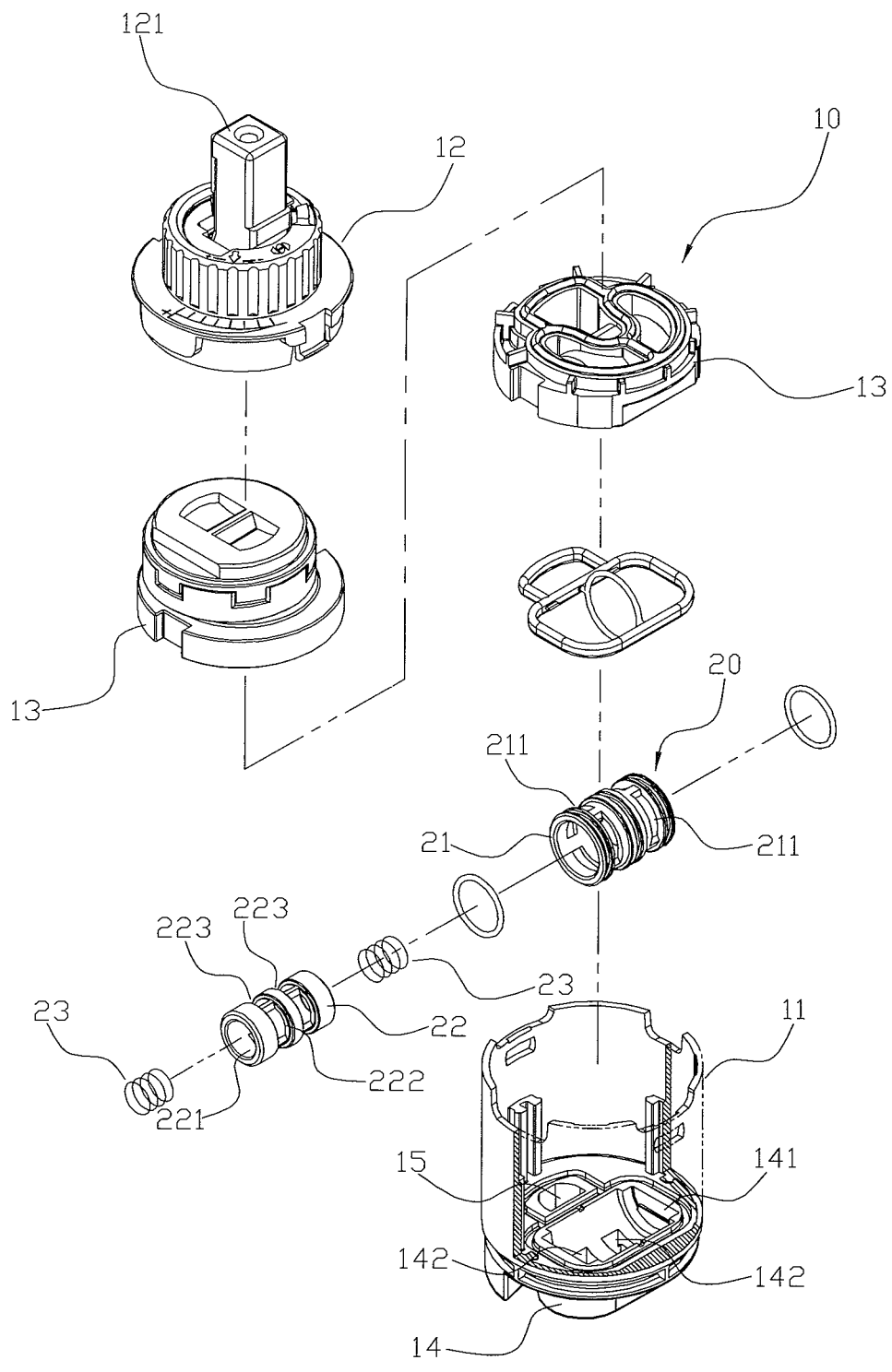
FIG. 2 is an exploded perspective view of the mixed water control valve for a faucet as shown in FIG. 1.
Figure 3:
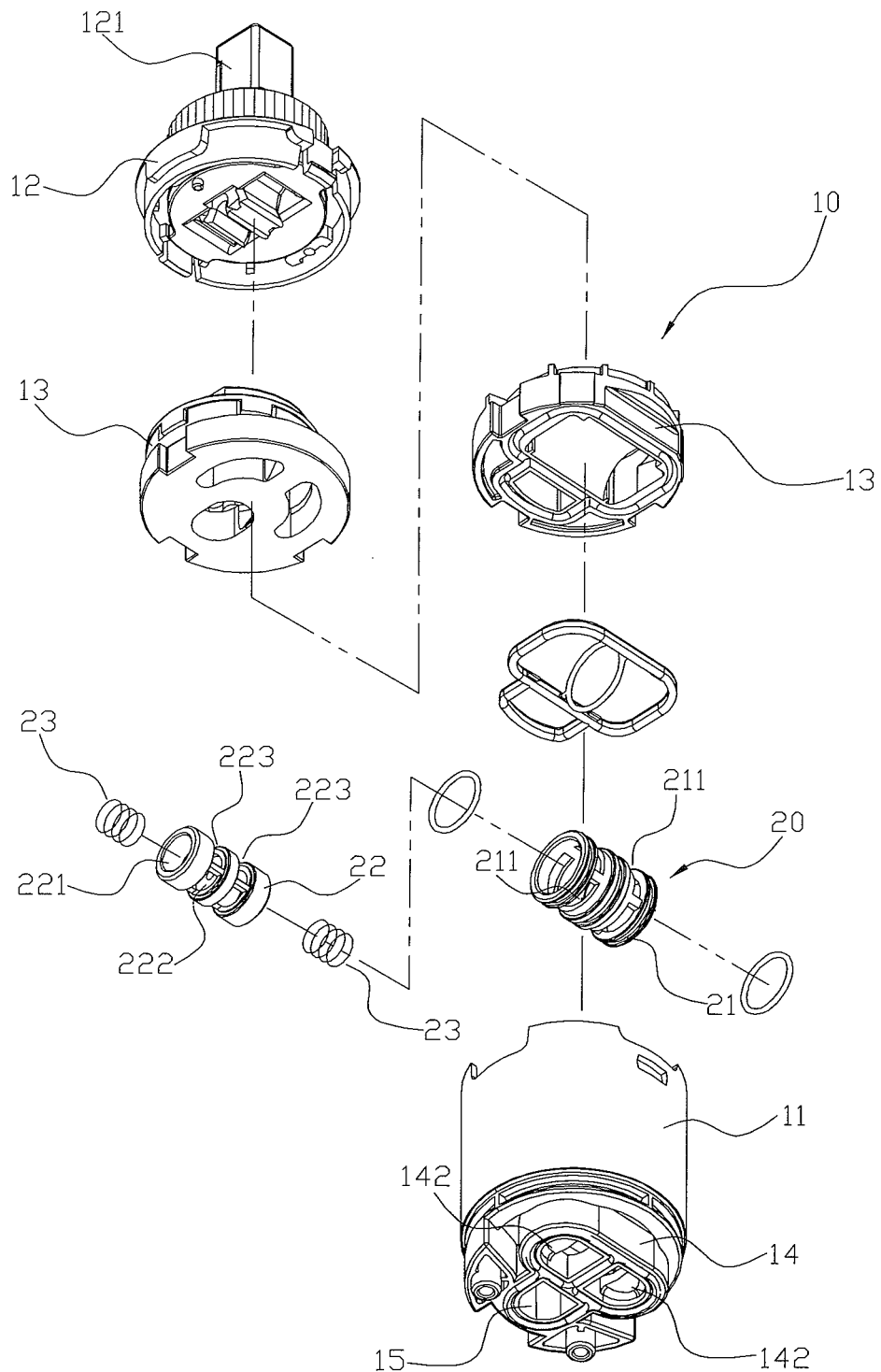
FIG. 3 is another exploded perspective view of the mixed water control valve for a faucet as shown in FIG. 1.
Figure 4:
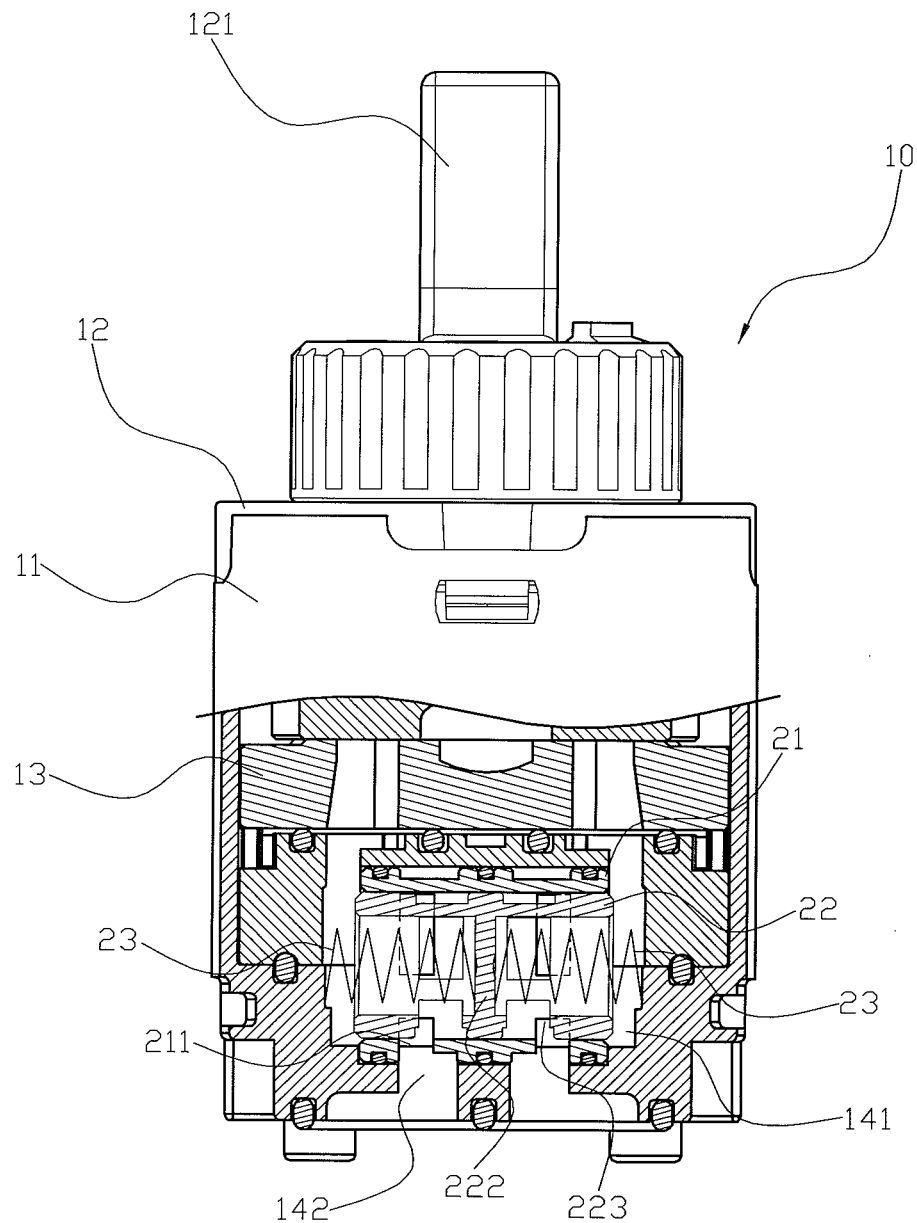
FIG. 4 is a front cross-sectional view of the mixed water control valve for a faucet as shown in FIG. 1.
Figure 5:
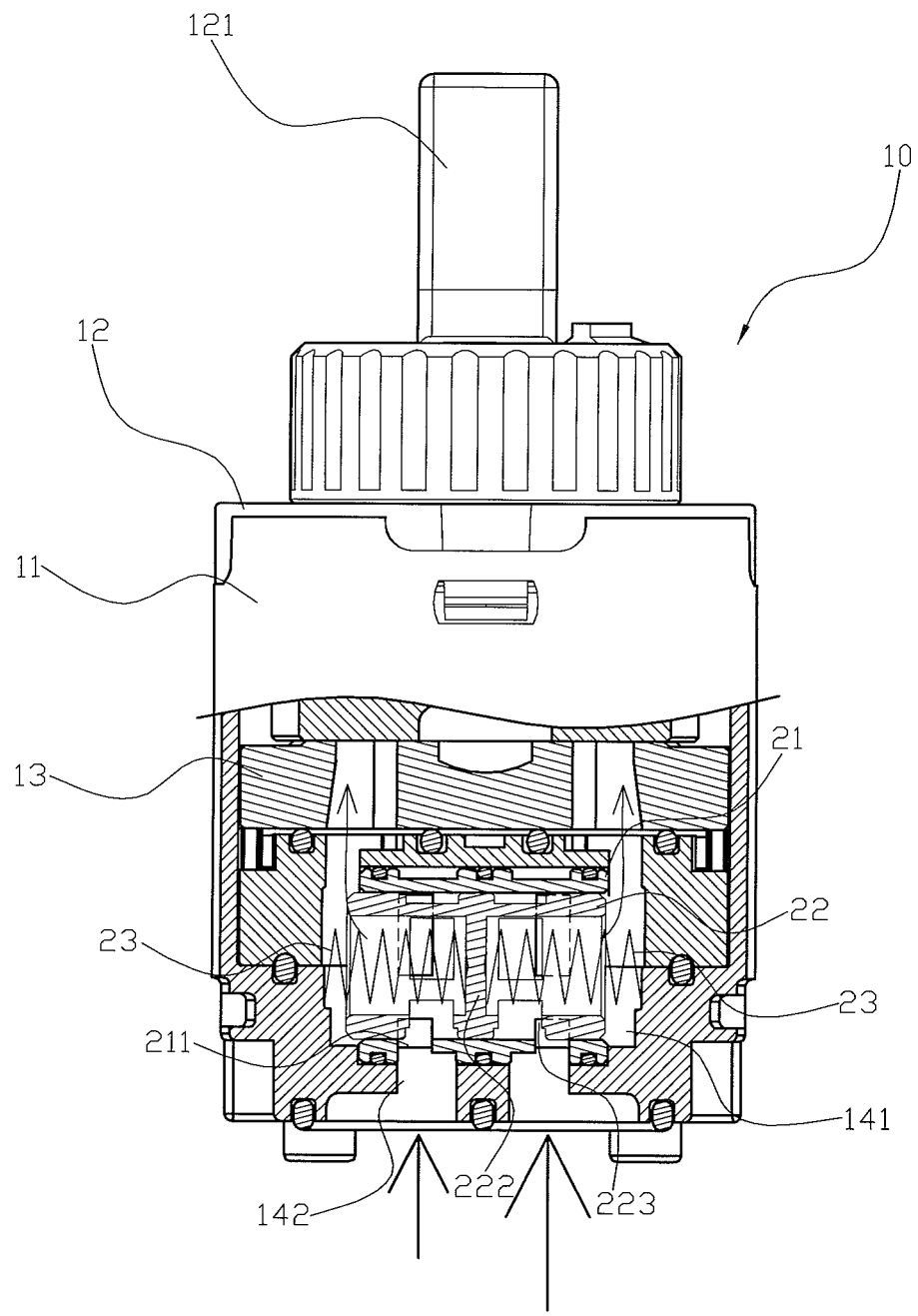
FIG. 5 is a schematic operational view of the mixed water control valve for a faucet as shown in FIG. 4.

In operation, referring to FIGS. 4 and 5 with reference to FIGS. 1-3, the cold water from the cold water source and the hot water from the hot water source in turn flow through the two water inlet holes 142 of the mounting seat 14, the two connecting grooves 211 of the fixed sleeve 21 and the two connecting slots 223 of the pressure regulating sleeve 22 into the two receiving spaces 221 of the pressure regulating sleeve 22 respectively. In such a manner, when the water flow of a first one (for example, the cold water terminal) of the water inlet holes 142 of the mounting seat 14 is reduced accidentally or stopped abnormally due to an irregular condition, the water pressure of the first one (the cold water terminal) of the water inlet holes 142 is reduced or disappears. Thus, the greater water pressure of a second one (for example, the hot water terminal) of the water inlet holes 142 of the mounting seat 14 will push the balance baffle 222 of the balance unit 20 toward the first one (the cold water terminal) of the water inlet holes 142, so that the pressure regulating sleeve 22 is moved in the fixed sleeve 21 to reduce or block the overlapping area of the respective connecting groove 211 of the fixed sleeve 21 and the respective connecting slot 223 of the pressure regulating sleeve 22 at the second one (the hot water terminal) of the water inlet holes 142 so as to reduce or stop the water flow of the second one (the hot water terminal) of the water inlet holes 142. Thus, the pressure regulating sleeve 22 is moved by a pressure differential between the two water inlet holes 142 of the mounting seat 14 so that the water flow of the two water inlet holes 142 can be regulated by movement of the pressure regulating sleeve 22 so as to achieve a water pressure balance and to stabilize the temperature of the mixed water in the valve housing 11.

Figure 6:
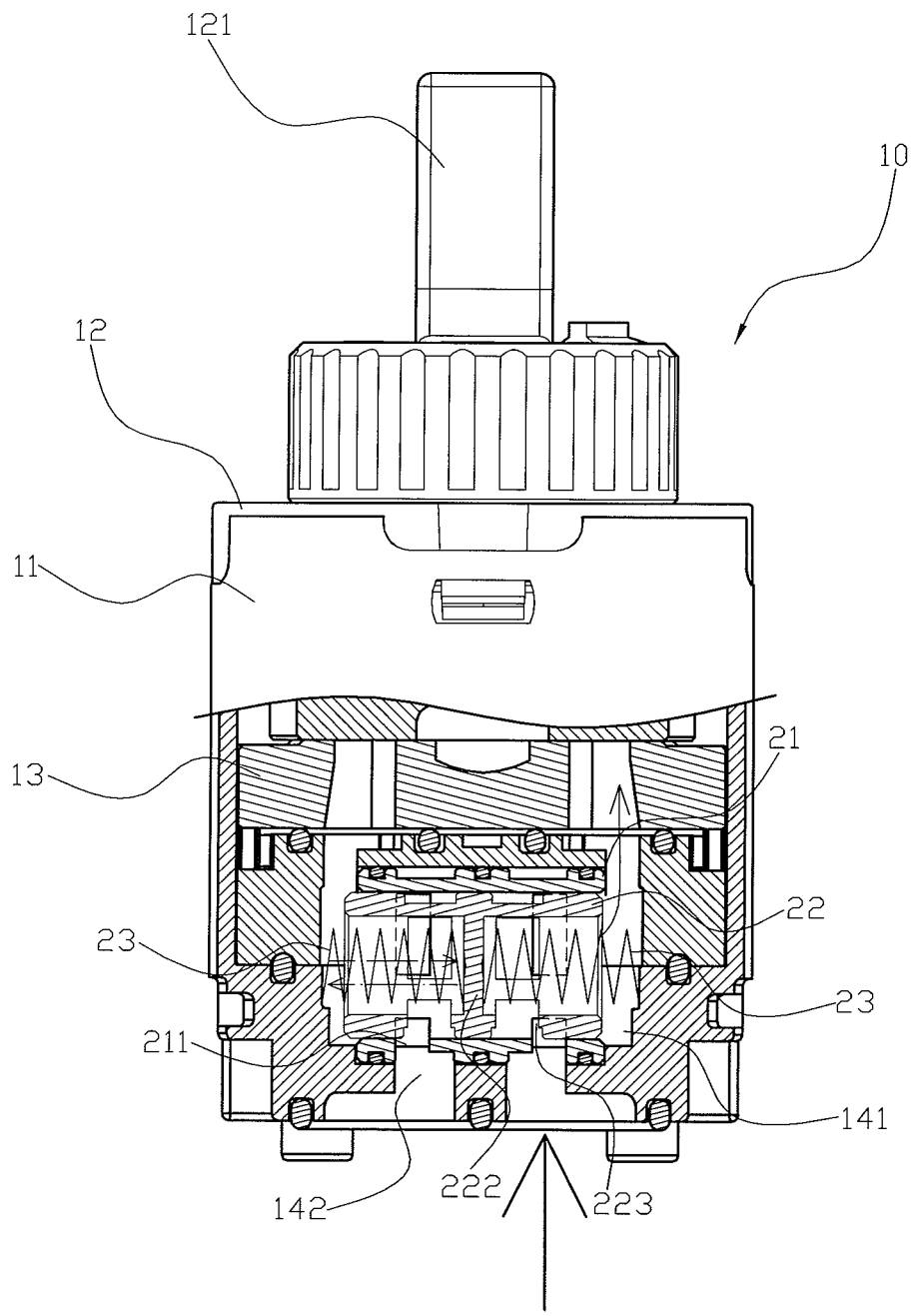
FIG. 6 is a schematic operational view of the mixed water control valve for a faucet as shown in FIG. 4.

As shown in FIG. 6, the (cold or hot) water only flows through one of the two water inlet holes 142 of the mounting seat 14, while other water equipment is also opened simultaneously so that a larger pressure is applied on the balance baffle 222 to push and move the pressure regulating sleeve 22 violently. At this time, the two elastic members 23 press the balance baffle 222 to provide a buffering force to counteract the larger pressure applied on the balance baffle 222 so that the pressure regulating sleeve 22 is moved smoothly and stably without producing resonant noise in the faucet. In addition, the pressure regulating sleeve 22 is moved slowly in the fixed sleeve 21 so that the pressure regulating sleeve 22 will not hit or wear the fixed sleeve 21 so as to enhance the lifetime of the balance unit 20.

Accordingly, the balance baffle 222 is compressed between the two elastic members 23 which provide a buffering force to counteract the larger pressure applied on the balance baffle 222 when the water only flows through one of the two water inlet holes 142, so that the pressure regulating sleeve 22 is moved smoothly and stably without producing resonant noise in the faucet. In addition, the pressure regulating sleeve 22 is moved slowly in the fixed sleeve 21 by buffering of the two elastic members 23 so that the pressure regulating sleeve 22 will not hit or wear the fixed sleeve 21 so as to enhance the lifetime of the balance unit 20.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A mixed water control valve, comprising:
a valve housing;
a control unit mounted on an open top of the valve housing; and
a balance unit mounted in the valve housing;
wherein the valve housing is integrally formed to have the open top and a bottom that provides a mounting seat, the mounting seat having a depression forming a receiving chamber to receive the balance unit from the open top of the valve housing and having two water inlet holes each connected to the receiving chamber;

the balance unit includes: a hollow fixed sleeve secured in the receiving chamber of the mounting seat; a pressure regulating sleeve movably mounted in the fixed sleeve; a balance baffle mounted in the pressure regulating sleeve; and two elastic members each mounted in the pressure regulating sleeve and each biased between the balance baffle and the mounting seat, wherein the balance unit is mounted between the valve housing and the control unit; the fixed sleeve of the balance unit has two open ends each connected to the receiving chamber of the mounting seat; the pressure regulating sleeve of the balance unit has two open ends each connected to the receiving chamber of the mounting seat; the balance baffle of the balance unit is located between the two connecting slots; the control unit includes a switching module adjustably mounted in the valve housing and an operation module mounted on the valve housing and connected with the switching module; the operation module of the control unit is mounted on the open top of the valve housing to close the open top of the valve housing; the operation module of the control unit is provided with a protruding control handle to operate the switching module.

2. The mixed water control valve of claim 1, wherein
the fixed sleeve of the balance unit has a periphery provided with two connecting grooves each connected to a respective one of the two water inlet holes of the mounting seat;

the pressure regulating sleeve of the balance unit has a periphery provided with two connecting slots each movable to align or partially align with a respective one of the two connecting grooves of the fixed sleeve;

the pressure regulating sleeve of the balance unit has an inner portion provided with two receiving spaces to receive the two elastic members;

the balance baffle of the balance unit is located at a middle position of the pressure regulating sleeve and is located between the two receiving spaces;

the balance baffle of the balance unit is compressed between the two elastic members;

the pressure regulating sleeve of the balance unit is kept at a middle position of the fixed sleeve by the two elastic members;

each of the two elastic members of the balance unit is received in a respective one of the two receiving spaces of the pressure regulating sleeve.

3. The mixed water control valve of claim 2, wherein
each of the two receiving spaces of the pressure regulating sleeve is connected to a respective one of the two connecting slots and is connected to the receiving chamber of the mounting seat;

each of the two elastic members of the balance unit is a compression spring and has a first end pressing the balance baffle and a second end pressing a peripheral wall of the receiving chamber.

* * * * *